_2,799,704_
_Patented July 16, 1957_

2,799,704

AUTO HYDROLYSIS OF BARIUM FILTRATE

Forest A. Hoglan, Glenview, Ill., assignor to International Minerals & Chemical Corporation, a corporation of New York No Drawing. Application April 13, 1955,
Serial No. 501,203

5 Claims. (Cl. 260—527)

This invention relates to a process for the recovery of glutamic acid from waste liquors of the beet sugar industry from which sugar has been wholly or partially removed. More particularly, it relates to a process for recovering glutamic acid from thin barium filtrate.

Thin barium filtrate is the residual solution remaining after the precipitation of sugar from beet sugar molasses as barium saccharate. Thin barium filtrate contains about 80% water along with sodium, barium, some sugar and other carbohydrates, organic acids, and nitrogenous substances, including glutamic acid and glutamic acid mother substances, such as pyrrolidone carboxylic acid. Because of the commercial value of glutamic acid, there has been a need for an efficient process for treating thin barium filtrate to convert the glutamic acid mother substances to glutamic acid and recover the glutamic acid from the reaction mixture.

By the term "thin barium filtrate" as used herein is meant barium filtrate taken as it is discharged from the desugarizing process and prior to carbonation and concentration. This filtrate possesses some alkalinity in the form of soluble barium hydroxide and potassium and sodium hydroxides.

It is an object of this invention to provide a process for converting the glutamic acid mother substances in thin barium filtrate to glutamic acid.

It is a further object of the instant invention to provide an improved process for the recovery of glutamic acid from thin barium filtrate.

Another object of the instant invention is to provide a process whereby glutamic acid may be produced by hydrolyzing thin barium filtrate in the absence of added hydrolytic agents.

It has been discovered that thin barium filtrate, having a pH above about 11.0 may be substantially completely hydrolyzed by simply storing the filtrate for between about 15 hours and about 120 hours at an elevated temperature. A thin barium filtrate having a pH below about 11.0 may be substantially completely hydrolyzed by storing for between about 15 hours and about 120 hours at an elevated temperature, followed by concentration of the hydrolyzed filtrate prior to removal of barium therefrom.

More particularly, thin barium filtrate, resulting from a barium desugarizing process and having a pH of about 12.0 and a temperature between about 55° C. and about 95° C., is allowed to cool gradually, for example, in an insulated container for between about 15 hours and about 120 hours. The pyrrolidone carboxylic acid present in the filtrate is substantially completely hydrolyzed to glutamic acid.

In another embodiment thin barium filtrate, directly from the desugarizing process and having a pH of about 10.0, is stored at a temperature between about 55° C. and about 95° C. for between about 15 hours and about 120 hours. The hydrolyzate is then concentrated by the removal of water to a dry substance content of between about 40% and about 80%. For example, the hydrolyzate is concentrated by heating at a temperature between about 50° C. and about reflux temperature, either at atmospheric pressure or reduced pressure. As the dry substance content of the hydrolyzate increases during the concentration, the hydrolysis proceeds to completion if it has not already done so. Alternatively, the hydrolysis and concentration of thin barium filtrate may be conducted simultaneously, thereby effecting the hydrolysis more quickly and efficiently and avoiding storage of the large volumes of thin filtrate for long periods of time. During concentration of the thin barium filtrate, the dry substance content is adjusted to between about 45% and about 75%, and the degree of hydrolysis of the glutamic acid precursor compounds approaches 100%. During this concentration, barium glutamate is formed and precipitates. After the completion of the concentration, about 50% or more of the total glutamic acid present is crystallizable as the barium salt. It is thought, although there is no intention to limit this invention to any particular theory, that as the barium is precipitated, the equilibruim is shifted, the sodium and potassium present forming their more soluble hydroxides, with a resulting increase in alkalinity which is responsible for causing the hydrolysis to proceed to substantial completion. In other words, sodium and potassium hydroxides are thought to be formed in situ as a result of glutamic acid reacting with barium hydroxide present in the thin barium filtrate. This results in the completion of the hydrolysis of pyrrolidonecarboxylic acid to glutamic acid. The solid phase barium glutamate is dissolved by neutralizing the hydrolyzate or by adding water to the hydrolyzate. Glutamic acid is then recovered from the resulting solution.

In a specific embodiment of the instant invention, thin barium filtrate, as it is taken from a barium desugarizing process and having an initial temperature between about 55° C. and about 95° C., preferably a temperature between about 75° C. and about 95° C., is introduced into a suitable storage container. During this transfer, the temperature of the filtrate generally decreases by about 5 to 10 degrees. The barium filtrate is preferably retained in storage for a period of approximately 24 hours to about 48 hours, during which time the temperature decreases to between about 30° C. and about 50° C. Hydrolysis at this point is at least 90% complete and possibly over 95% complete.

The resulting hydrolyzate is then concentrated by heating and evaporation, for example, in vacuo at a temperature between about 50° C. and the reflux temperature, preferably between about 50° C. and about 70° C. to a dry solids content between about 40% and about 80%, preferably to between about 45% and about 75%. The hydrolysis of the pyrrolidonecarboxylic acid to glutamic acid is then substantially complete and glutamic acid can be recovered from the hydrolyzate by any of the conventional methods for the recovery of glutamic acid from aqueous solutions.

According to another embodiment, the hydrolyzed thin barium filtrate is neutralized in order to precipitate the barium. The neutralization is effected with a reagent capable of reacting with barium to form an insoluble barium salt. Thus sodium carbonate, sodium bicarbonate, potassium carbonate, potassium bicarbonate, sulfuric acid, carbon dioxide, or the like, may be added to the hydrolyzed liquor to precipitate the barium ions as the corresponding insoluble barium salts. The insoluble barium salt may be separated by any convenient means as, for example, by filtration. Glutamic acid is crystallized from the filtrate from which barium has been separated by concentrating, adjusting the pH of the hydrolyzate with an acidic reagent, such as sulfuric acid or hydrochloric acid to between about 2.5 and about 3.5, and separating the glutamic acid which crystallizes from the resulting liquor. The concentrated filtrate may also be strongly acidified with hydrochloric acid and the glutamic acid crystallized and removed as glutamic acid hydrochloride.

In another embodiment of the instant invention, thin barium filtrate, directly from a barium desugarization process, is simultaneously hydrolyzed and concentrated in vacuo at a temperature between about 50° C. and the reflux temperature, preferably between about 50° C. and about 70° C. to between about 45% and about 75% dry substance content. The resulting hydrolyzate is neutralized with a reagent which will form an insoluble precipitate with barium, for example, with carbon dioxide, to a pH between about 8.0 and about 12.0, preferably between about 9.0 and about 10.5, and the barium carbonate which is precipitated from the hydrolyzate is separated, for example by filtration. The pH of the resulting solution is then reduced to between about 4.5 and about 5.5 with sulfuric or hydrochloric acid and is concentrated, if necessary, to a dry substance content of between about 40% and about 85%, by weight. Any solids which precipitate from the hydrolyzate are separated, for example by filtration. The pH of the resulting liquor is reduced to about 3.2 with an inorganic acid and glutamic acid is crystallized from the solution and separated by filtration.

In still another embodiment, glutamic acid is recovered from thin barium filtrate hydrolyzate by precipitation of barium glutamate in the presence of methanol as described and claimed in co-pending U. S. application, Serial No. 368,846, filed July 1, 1953. The thin hydrolyzate is concentrated to between about 60% and about 80% dry solids content, neutralized to a pH between about 9.0 and about 9.5 with hydrochloric acid, and sufficient methanol is added to the resulting hydrolyzate to cause the precipitation of barium glutamate, which is separated from the liquor, for example by filtration. To produce glutamic acid from the barium glutamate, it is dissolved in water, the barium is precipitated from the resulting solution as an insoluble barium salt, and glutamic acid is crystallized and separated from the solution from which the barium salt has been separated. For example, the barium is precipitated by the addition of carbon dioxide, sodium carbonate, sodium bicarbonate, sulfuric acid, sulfurous acid, or sulfur dioxide, to the solution. The insoluble barium salt is separated, for example by filtration. Glutamic acid is crystallized and separated from the resulting solution after concentration and adjustment of the pH of the solution to between about 3.0 and about 3.3 or by further acidification with hydrochloric acid and removal of glutamic acid hydrochloride.

The following examples are presented in order to afford a clearer understanding of the practice of the invention. Unless otherwise indicated, all parts and percentages are by weight.

*Example I*

Thin barium filtrate having a pH of about 10.5 and containing about 20% dissolved solids is transferred directly from a barium desugarization process to a retaining tank. The thin barium filtrate having an initial temperature of about 90° C. will cool during the transfer to about 80° C. The filtrate is then stored in a tank for about 36 hours, during which period the temperature of the filtrate decreases to about 30° C. At this point the degree of hydrolysis of the glutamic acid precursors will amount to about 90–95% of the theoretical. The resulting hydrolyzate, without preliminary neutralization, is concentrated at a temperature between about 60° C. and about 65° C. under a vacuum of about 27 inches mercury to a dry substance content of between about 65% and about 70%. Substantial quantities of solid material precipitate as a result of the concentration. The concentration step results in substantially complete hydrolysis of the glutamic acid precursors.

Barium is removed from a suiable sized portion of the concentrated barium filtrate hydrolyzate by adding sufficient carbon dioxide to obtain a pH of about 8.5. The barium carbonate which forms is separated by filtration. The resulting filtrate can be adjusted to a pH of between about 5.0 and about 5.5 with sulfuric or hydrochloric acid and then concentrated to about 80% dry substance content. Inorganic salts which form during the concentration are separated by filtration. The pH of the resulting solution is reduced to about 3.2 with hydrochloric acid and the glutamic acid which crystallized from the resulting liquor is separated by filtration. The yield of glutamic acid amounts to a recovery of about 80%.

*Example II*

About 100 parts of concentrated barium filtrate hydrolyzate produced as described in Example I are adjusted to a pH of about 9.2 with sulfuric acid. The resulting precipitate of barium sulfate is separated from the hydrolyzate by filtration. The barium sulfate precipitate is then washed with two portions of warm water (about 60° C.) and the washings are discarded. Discarding the washings removes considerable organic material as barium salts, thereby permitting the remaining filtrate to be concentrated to a greater extent than would otherwise be possible. In a continuous process or in a commercial batch process the washings would be recycled back in the process, that is, added to a portion of thin barium filtrate or thin barium filtrate hydrolyzate which was yet to be treated for the removal of impurities. The primary filtrate to which the wash water was not added is adjusted to about pH 4.5 by the addition of 50% aqueous solution of sulfuric acid. The adjusted filtrate is concentrated in vacuo to about 85% dry substance content and the inorganic sulfates which precipitate during the concentration step are removed by filtration at about 80° C. The resulting filtrate is adjusted to about pH 3.2 by the addition of 50% aqueous sulfuric acid solution, cooled to room temperature, and allowed to crystallize for about 5 days. The glutamic acid crystals are removed by filtration. The remaining end liquor produced by this procedure amounts to only about 70% of that resulting from the standard alkaline processing of concentrated Steffen's filtrate. The glutamic acid in the end liquor corresponds to a loss about 60% lower than that occurring in standard procedures for glutamic acid recovery. The yield of glutamic acid is about 82% of the glutamic acid values in the starting material.

*Example III*

About 100 grams of concentrated barium filtrate hydrolyzate produced by hydrolyzing thin barium filtrate as described in Example I and then concentrated to about 70% dry solids content are adjusted to a pH of about 9.5 with hydrochloric acid. About 600 milliliters of methanol are added to the neutralized hydrolyzate and the barium glutamate which precipitates from the hydrolyzate is separated by filtration. The precipitate of barium glutamate contains between about 90% and about 99% of the total glutamic acid present. About 200 milliliters of water are then added to dissolve the barium glutamate and sufficient sodium carbonate is added to the resulting solution to precipitate substantially all the barium. Barium carbonate which precipitates from the solution is then removed by filtration. The filtrate is then adjusted to pH 5.0 with hydrochloric acid and concentrated to about 80% solids content and the solids removed by filtration at about 80° C. Hydrochloric acid is then added to the filtrate to reduce the pH to about 3.2 and the glutamic acid which crystallizes is separated by filtration. The yield of glutamic acid amounts to about 80% of the theoretical.

Having thus fully described and illustrated the character of the instant invention, what is desired to be secured by Letters Patent is.

1. An auto hydrolytic process for the recovery of glutamic acid values from thin barium filtrate containing barium hydroxide and having a pH below about 11, which comprises storing and maintaining said filtrate at an elevated temperature initially between about 55 and about 95° C. until the glutamic acid mother substances present therein have been partially hydrolyzed and converted into glutamic acid, then concentrating the partially hydrolyzed filtrate at a temperature between about 50° C. and the reflux temperature thereof, prior to removal of barium therefrom, to a dry substance content between about 40 and about 80% by weight, whereby the hydrolysis is substantially completed, and recovering glutamic acid from the resulting hydrolyzate.

2. A process as in claim 1 wherein said thin barium filtrate has a pH of about 10.0.

3. A process as in claim 1 wherein said thin barium filtrate is stored at an initial temperature between about 75 and about 95° C.

4. A process as in claim 1 wherein said partially hydrolyzed filtrate is concentrated to a dry solids content between about 45 and about 75% by weight.

5. The process of claim 1 wherein the preliminary hydrolysis and the concentration of said thin barium filtrate are conducted simultaneously.

References Cited in the file of this patent
UNITED STATES PATENTS

| | | |
|---|---|---|
| 1,582,472 | Ikeda | Apr. 27, 1926 |
| 2,373,342 | Royal | Apr. 10, 1945 |
| 2,525,902 | Hoglan et al. | Oct. 17, 1950 |
| 2,535,117 | Bennett | Dec. 26, 1950 |
| 2,706,737 | Cardinal | Apr. 19, 1955 |
| 2,730,545 | Hoglan | Jan. 10, 1956 |